United States Patent
Tsai

[11] Patent Number: 6,145,655
[45] Date of Patent: Nov. 14, 2000

[54] LENS CLEANING KIT

[76] Inventor: Allan Tsai, 2F, No. 1, Lane 222, Tun-Hua N. Rd., Taipei City, Taiwan

[21] Appl. No.: 09/411,951

[22] Filed: Oct. 4, 1999

[51] Int. Cl.[7] .................................................. A45C 15/00
[52] U.S. Cl. .......................... 206/38; 206/223; 206/229; 206/234
[58] Field of Search .................................. 206/223, 229, 206/38, 234

[56] References Cited

U.S. PATENT DOCUMENTS

| | | | |
|---|---|---|---|
| 1,084,605 | 1/1914 | Carley | 206/38 R |
| 5,000,204 | 3/1991 | Smith | 134/6 |
| 5,083,337 | 1/1992 | Jones | 206/223 |
| 5,083,661 | 1/1992 | Burwell | 206/37 |
| 5,305,934 | 4/1994 | Grey | 224/617 |

*Primary Examiner*—Paul T. Sewell
*Assistant Examiner*—Troy Arnold
*Attorney, Agent, or Firm*—Foley & Lardner

[57] ABSTRACT

A lens cleaning kit includes an elongate front housing member. The front housing member has an open front end and a closed rear end. The front housing member defines an applicator receiving space therein. The lens cleaning kit also includes a cleaning liquid applicator formed as an elongate liquid absorbing block that absorbs and retains a liquid cleaning agent. The liquid applicator has a retaining portion fittingly disposed in the applicator receiving space and an applying end portion that extends out of the applicator receiving space through the open front end of the front housing member. The liquid applicator can apply liquid cleaning agent on a lens surface to be cleaned when the applying end portion of the liquid applicator is rubbed on the lens surface. The retaining portion of the liquid applicator can be drawn out of the applicator receiving space by pulling the applying end portion in the longitudinal direction to expose a section of the retaining portion, such that, when the applying end portion becomes soiled, the applying end portion can be cut off from the retaining portion. The section of the retaining portion exposed from the applicator receiving space can serve as a new applying end portion of the liquid applicator. A front cover member is removably mounted on the front housing member to cover the applying end portion of the liquid applicator.

13 Claims, 4 Drawing Sheets

LENS CLEANING KIT

FIELD OF THE INVENTION

The invention relates to a cleaning kit, more particularly to a lens cleaning kit which is convenient to be taken along by a user for cleaning lenses of a pair of eyeglasses.

BACKGROUND OF THE INVENTION

A person, who wears a pair of eyeglasses, usually carries a lens cleaning cloth for cleaning the lenses of the eyeglasses to maintain clear vision. It is noted that wiping of the lenses with the lens cleaning cloth does not result in satisfactory clarity of the lenses, and hence cleaning liquid devices, such as in the form of sprays or drops, have been in use in order to enhance the cleaning effect of the lenses.

A conventional cleaning liquid device generally includes a container for receiving a lens cleaning liquid agent therein, and a spraying nozzle mounted operably on the container. By pressing on the nozzle, the cleaning liquid agent can be sprayed for soaking the lenses of the eyeglasses. However, the following drawbacks arise:

(i) The cleaning liquid agent will leak out if the spray nozzle is damaged. The eyeglass wearer must be very careful in handling the cleaning liquid device to prevent damage to the same, thereby causing inconvenience to the wearer.

(ii) Because the lens cleaning cloth and the liquid cleaning liquid container are separably disposed, the wearer may accidentally forget to take along one of these items, thereby hampering cleaning of the lenses.

(iii) In case an excessive amount of cleaning liquid agent is applied on the lenses to be cleaned, the lens cleaning cloth may become sticky when wiping out the cleaning liquid agent from the lenses.

In order to eliminate the aforesaid drawbacks, a pen-type lens cleaning device has be proposed. The pen-type lens cleaning device includes a container defining a reservoir for receiving the cleaning liquid agent therein, and a nib assembly mounted on the container and in fluid communication with the reservoir. The nib assembly is made of a liquid absorbing material and is adapted to apply the cleaning liquid agent on a lens surface when rubbed on the latter. The nib assembly, however, may become soiled after long term use, and the soiled portion can not be cut off or replaced.

SUMMARY OF THE INVENTION

The main object of this invention is to provide a lens cleaning kit which is clear of the aforesaid drawbacks that generally result from the use of the conventional lens cleaning devices.

Accordingly, the lens cleaning kit of the present invention includes a front housing member, a cleaning liquid applicator, and a front cover member. The front housing member is elongate in a longitudinal direction, and has an open front end and a closed rear end in the longitudinal direction. The front housing member confines an applicator receiving space therein. The cleaning liquid applicator is formed as an elongate liquid absorbing block that is adapted to absorb and retain a liquid cleaning agent. The liquid applicator has a retaining portion that is fittingly disposed in the applicator receiving space, and an applying end portion that extends outwardly of the applicator receiving space via the open front end of the front housing member and that is adapted for applying the liquid cleaning agent on a lens surface to be cleaned when the applying end portion is rubbed on the lens surface. The retaining portion is capable of being drawn outwardly of the applicator receiving space by pulling at the applying end portion in the longitudinal direction to expose a section thereof from the applicator receiving space so that, when the applying end portion becomes soiled after a period of use and is cut off from the retaining portion, the section of the retaining portion that is exposed from the applicator receiving space can serve as a new applying end portion of the liquid applicator. The front cover member is mounted removably on the open front end of the front housing member to cover the applying end portion of the liquid applicator.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
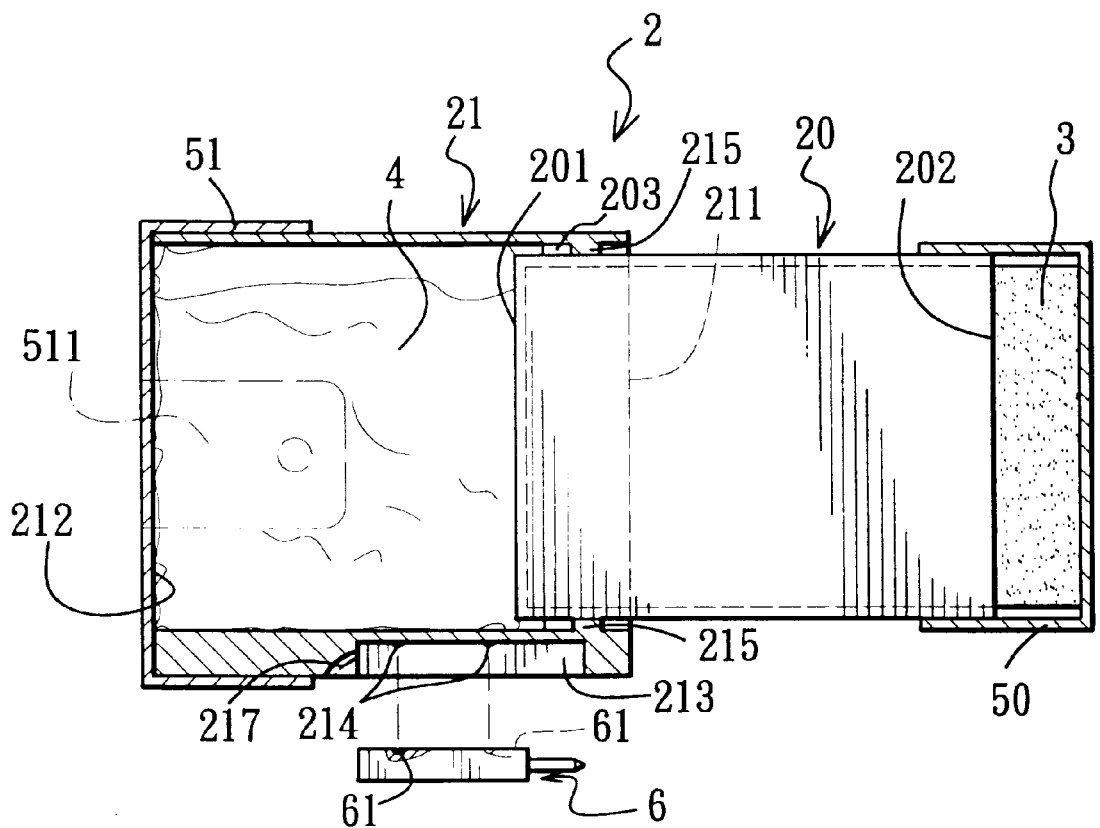
FIG. 1 is a fragmentary sectional view of the first preferred embodiment of a lens cleaning kit of the present invention.
Figure 2:
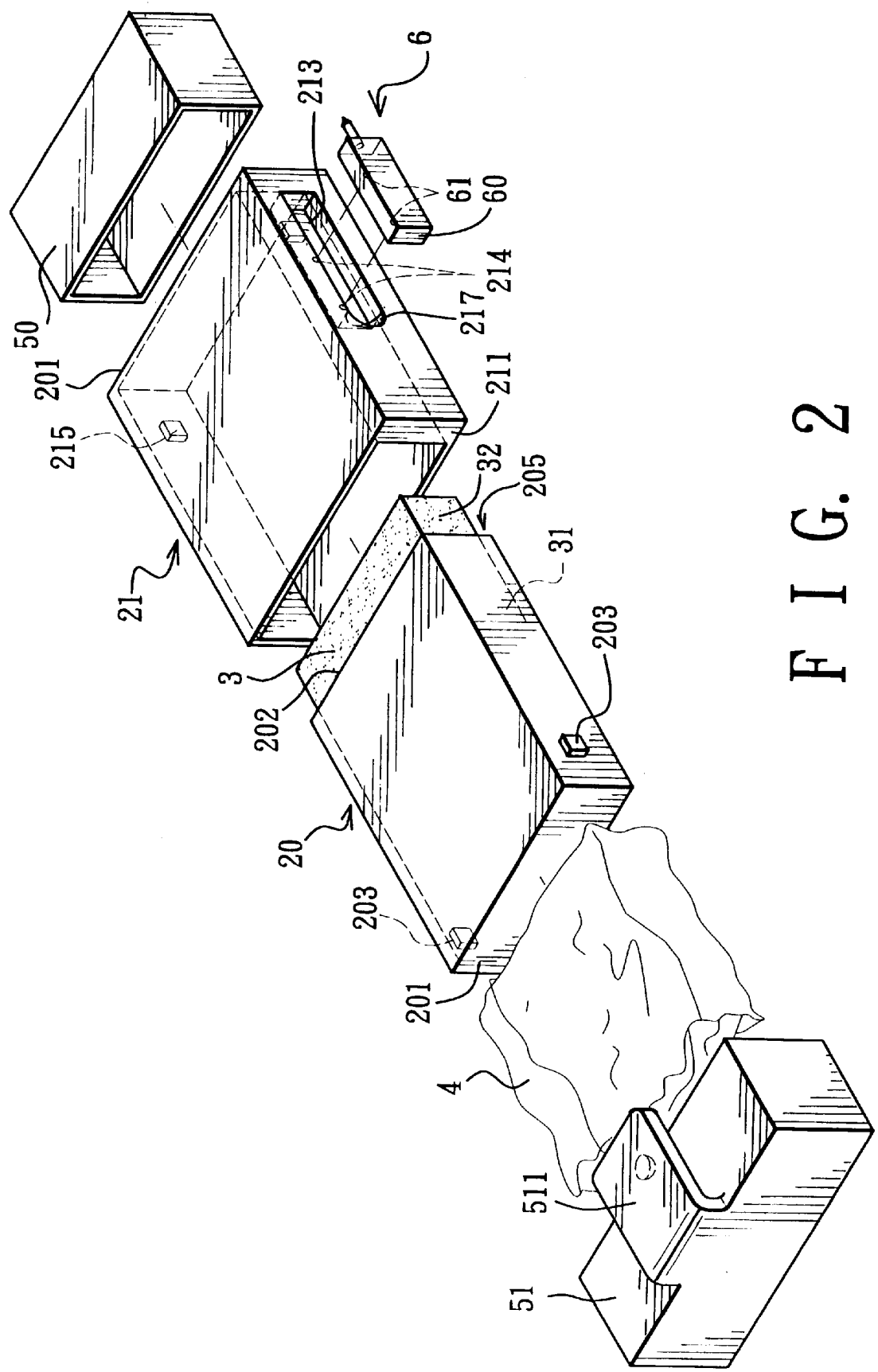
FIG. 2 is an exploded perspective view of the first preferred embodiment.
Figure 3:
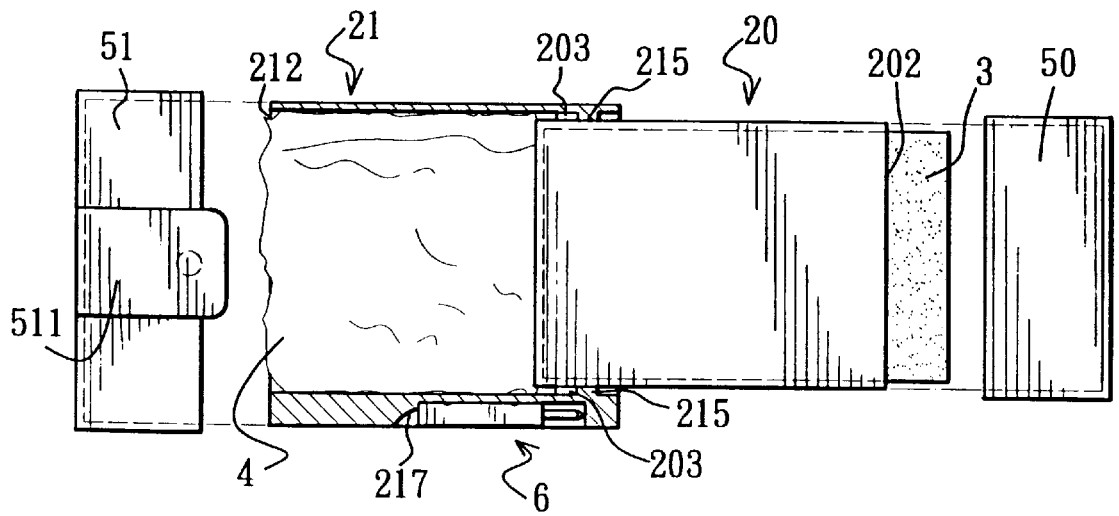
FIGS. 3 and 4 illustrate partly sectional views of the first preferred embodiment.

Referring to FIGS. 1, 2 and 3, the preferred embodiment of a lens cleaning kit according to the present invention is shown to include a front housing member 20, a cleaning liquid applicator 3, and a front cover member 50.

As illustrated, the front housing member 20 is elongate in a longitudinal direction, and confines an applicator receiving space 205 therein with an open front end 202 and a closed rear end 201 in the longitudinal direction.

The cleaning liquid applicator 3 is formed as an elongate liquid absorbing block that is adapted to absorb and retain a liquid cleaning agent. The liquid applicator 3 has a retaining portion 31 that is fittingly disposed in the applicator receiving space 205 of the front housing member 20, and an applying end portion 32 that extends outwardly of the applicator receiving space 205 via the open front end 202 of the front housing member 20 and that is adapted for applying the liquid cleaning agent on a lens surface (not shown) to be cleaned when the applying end portion 32 is rubbed on the lens surface. The retaining portion 31 of the liquid applicator 3 is capable of being drawn outwardly of the applicator receiving space 205 by pulling at the applying end portion 32 in the longitudinal direction to expose a section thereof from the applicator receiving space 205 so that, when the applying end portion 32 becomes soiled after a period of use and is cut off from the retaining portion 31, the section of the retaining portion 31 that is exposed from the applicator receiving space 205 can serve as a new applying end portion of the liquid applicator 3.

The front cover member 50 is mounted removably on the open front end 202 of the front housing member 20 to cover the applying end portion 32 of the liquid applicator 3.

The preferred embodiment further includes a rear housing member 21 that has a front end 210 connected to the front housing member 20, and an open rear end 211 opposite to the front end 210 of the rear housing member 21 in the longitudinal direction. The rear housing member 21 cooperates with the front housing member 20 to form a handheld housing, and confines an accommodating chamber 212 (see FIG. 3) therein. A rear cover member 51 is mounted removably on the open rear end 211 of the rear housing member 21 for closing the accommodating chamber 212. The front end 210 of the rear housing member 21 is an open end that is sleeved on the rear end 201 of the front housing member 20. The front housing member 20 is slidable non-rotatably relative to the rear housing member 21 in the longitudinal direction and can be retracted into the rear housing member 21.

A retainer unit is provided on the front and rear housing members 20,21 to limit relative movement and prevent disengagement therebetween in the longitudinal direction. In this embodiment, the retainer unit includes a pair of outward projections 203 that project outwardly from opposite sides of the front housing member 20 proximate to the closed rear end 201 thereof. The retainer unit further includes a pair of inward projections 215 that project inwardly from opposite sides of the rear housing member 21 at the front end 210 of the rear housing member 21. The inward projections 215 are aligned with the outward projections 203 in the longitudinal direction and engage the outward projections 203 to limit relative movement and prevent disengagement between the front and rear housing members 20,21 when the front housing member 20 is extended from the rear housing member 21, as best shown in FIG. 3.

Figure 4:
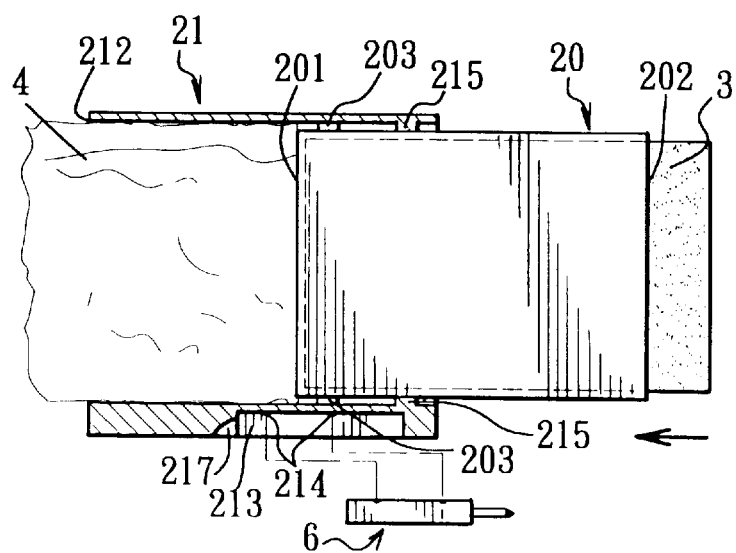

A lens cleaning cloth, preferably of a soft clothing material, is disposed removably in the accommodating chamber 212. The lens cleaning cloth 4 is expelled from the accommodating chamber 212 when the rear cover member 51 is removed from the rear housing member 21, and the front housing member 20 is retracted into the rear housing member 21, as best shown in FIG. 4.

The preferred embodiment further includes a screw driving tool 6 with an operating head adapted to drive a screw for tightening the bows on an eyeglasses frame (not shown). The rear housing member 21 has an outer wall surface formed with a tool retention groove 213 for receiving the screw driving tool 6 removably therein. The outer wall surface of the rear housing member 21 is further formed with a finger recess 217 that extends to the tool retention groove 213 to facilitate removal of the screw driving tool 6 from the tool retention groove 213. The tool retention groove 213 has a pair of retaining projections 214 that project from an innermost wall thereof. The screw driving tool 6 has a handle portion 60 formed with a pair of engaging grooves 61 for engaging removably the retaining projections 214 to retain removably the screw driving tool 6 in the tool retention groove 213.

In the preferred embodiment, the front and rear housing members 20,21 have a rectangular cross section along a plane transverse to the longitudinal direction for slidable and non-rotatable engagement therebetween. A clip 511 is provided on an outer wall surface of the rear cover member 51 to facilitate carrying of the lens cleaning kit.

Figure 5:
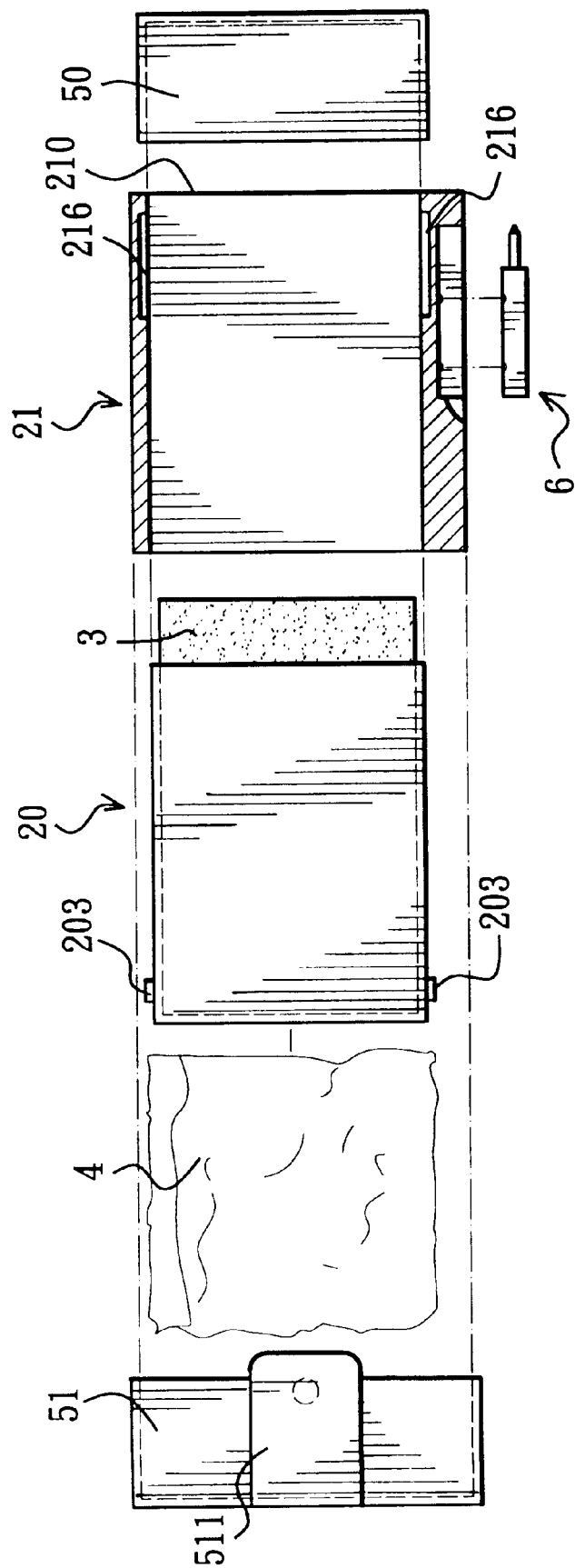
FIG. 5 is a sectional view of the second preferred embodiment of a lens cleaning kit of the present invention.

Referring to FIG. 5, a modified preferred embodiment of the present invention is shown to be generally similar to the previous embodiment in construction, except that the retainer unit includes a retainer groove unit having a pair of retainer grooves 216 that are formed in an inner surface of the rear housing member 21 at the front end 210 of the rear housing member 21. The retainer grooves 216 are aligned with the outward projections 203 in the longitudinal direction and engage the outward projections 203 to limit relative movement and prevent disengagement between the front and rear housing members 20,21 when the front housing member 20 is extended from the rear housing member 21.

The advantages that result from the use of the lens cleaning kit of this invention are as follow:

(i) Since the lens cleaning cloth 4 is retained in the accommodating chamber 212 defined by the housing members 20,21, it is unlikely for the user to forget to take the lens cleaning cloth 4 with him.

(ii) The liquid cleaning agent is fully absorbed by the liquid applicator 3, and is prevented from leaking therefrom. Thus, the user need not worry that his clothes will be smeared with the liquid cleaning agent.

(iii) Mere rubbing of the liquid applicator 3 on the lens surface will provide an adequate amount of the liquid cleaning agent. Undesirable soaking of the lens cleaning cloth 4 is thus avoided.

(iv) The liquid applicator 3 is replaceable, thereby resulting in convenience to the user of the lens cleaning kit of the present invention.

With this invention thus explained, it is apparent that numerous modifications and variations can be made without departing from the scope and spirit of this invention. It is therefore intended that this invention be limited-only as indicated in the appended claims.

What is claimed is:

1. A lens cleaning kit comprising:

a front housing member that is elongated in a longitudinal direction, said front housing member having an open front end and a closed rear end in the longitudinal direction, said front housing member confining an applicator receiving space therein;

a cleaning liquid applicator formed as an elongated liquid absorbing block that is adapted to absorb and retain a liquid cleaning agent, said liquid applicator having a retaining portion that is movably disposed in said applicator receiving space to move relative to said front housing member in the longitudinal direction, said liquid applicator also having an applying end portion that extends outwardly of said applicator receiving space via said open front end of said front housing member and that is adapted for applying the liquid cleaning agent on a lens surface to be cleaned when said applying end portion is rubbed on the lens surface, said retaining portion is adapted to be drawn outwardly of said applicator receiving space by pulling said applying end portion in the longitudinal direction to expose a section thereof from said applicator receiving space, and said applying end portion is adapted to be removed from said retaining portion when said applying end portion becomes soiled, said section of said retaining portion that is exposed serving as a new applying end portion of said liquid applicator;

a front cover member removably mounted on said open front end of said front housing member to cover said applying end portion of said liquid applicators; and a rear housing member slidably connected to said front housing member, said rear housing member having an open front end sleeved on said rear end of said front housing member and having an open rear end opposite to said open front end of said rear housing member, said front housing member being slidable in the longitudinal direction relative to said rear housing member for retraction into said rear housing member, said rear housing member cooperating with said front housing member to form a handheld housing and confining an accommodating chamber therein;

a rear cover member removably mounted on said open rear end of said rear housing member for closing said accommodating chamber; and a retainer unit provided on said front and rear housing members to limit relative movement and to prevent disengagement therebetween in the longitudinal direction.

2. The lens cleaning kit as defined in claim 1, wherein said rear housing member is sleeved non-rotatably on said front housing member.

3. The lens cleaning kit as defined in claim 2, wherein said retainer unit includes a pair of outward projections that project outwardly from opposite sides of said front housing member proximate to said closed rear end thereof.

4. The lens cleaning kit as defined in claim 3, wherein said retainer unit further includes a pair of inward projections that project inwardly from opposite sides of said rear housing member at said front end of said rear housing member, said inward projections being aligned with said outward projections in the longitudinal direction and engaging said outward projections to limit relative movement and prevent disengagement between said front and rear housing members when said front housing member is extended from said rear housing member.

5. The lens cleaning kit as defined in claim 3, wherein said retainer unit further includes a retainer groove unit formed in an inner surface of said rear housing member at said front end of said rear housing member, said retainer groove unit engaging said outward projections to limit relative movement and prevent disengagement between said front and rear housing members when said front housing member is extended from said rear housing member.

6. The lens cleaning kit as defined in claim 1, further comprising a lens cleaning cloth disposed removably in said accommodating chamber, said lens cleaning cloth being expelled from said accommodating chamber when said rear cover member is removed from said rear housing member and said front housing member is retracted into said rear housing member.

7. The lens cleansing kit as defined in claim 1, further comprising a lens cleaning cloth disposed removably in said accommodating chamber.

8. The lens cleaning kit as defined in claim 1, further comprising a screw driving tool, said rear housing member having an outer wall surface formed with a tool retention groove for receiving said screw driving tool removably therein.

9. The lens cleaning kit as defined in claim 1, wherein said outer wall surface of said rear housing member is further formed with a finger recess that extends to said tool retention groove to facilitate removal of said screw driving tool from said tool retention groove.

10. The lens cleaning kit as defined in claim 8, wherein said tool retention groove has a retaining projection that projects thereinto, and said screw driving tool has a handle portion formed with an engaging groove for engaging removably said retaining projection to retain removably said screw driving tool in said tool retention groove.

11. The lens cleaning kit as defined in claim 1, wherein said front and rear housing members have a rectangular cross section along a plane transverse to the longitudinal direction.

12. The lens cleaning kit as defined in claim 1, wherein said applying end portion is adapted to be cut off of said retaining portion.

13. A method of cleaning a lens surface, comprising the steps of:

providing front housing member having an open front end, the front housing member defining an applicator receiving space therein;

providing a cleaning liquid applicator adapted to absorb and retain a liquid cleaning agent, the liquid applicator having a retaining portion disposed in the applicator receiving space and an applying end portion extending outwardly from the applicator receiving space at the front end of the front housing member;

rubbing the applying end portion on a lens surface to be cleaned to apply the liquid cleaning agent on the lens surface;

pulling the applying end portion in a longitudinal direction of the front housing member to expose a section of the retaining portion from within the applicator receiving space;

cutting off the applying end portion of the liquid applicator; and maintaining the exposed section of the retaining portion as a new applying end portion.

* * * * *